US006954422B1

(12) United States Patent
Suehiro et al.

(10) Patent No.: US 6,954,422 B1
(45) Date of Patent: Oct. 11, 2005

(54) COMB-FORM SPECTRUM COMMUNICATION SYSTEMS USING REPEATED COMPLEMENTARY SEQUENCE MODULATION

(75) Inventors: Naoki Suehiro, 18-14, Azuma 3-chome, Tsukuba-shi, Ibaraki 305-0031 (JP); Noriyoshi Kuroyanagi, 44-14, Sakuragaoka 3-chome, Higashiyamato-shi, Tokyo 207-0022 (JP)

(73) Assignees: Naoki Suehiro, Ibaraki (JP); Noriyoshi Kuroyanagi, Tokyo (JP); Toyo Communication Equipment Co., Ltd., Kanagawa (JP)

( * ) Notice: Subject to any disclaimer, the term of this patent is extended or adjusted under 35 U.S.C. 154(b) by 0 days.

(21) Appl. No.: 09/423,792

(22) PCT Filed: Mar. 11, 1999

(86) PCT No.: PCT/JP99/01185

§ 371 (c)(1), (2), (4) Date: Jan. 3, 2000

(87) PCT Pub. No.: WO99/46878

PCT Pub. Date: Sep. 16, 1999

(30) Foreign Application Priority Data

Mar. 13, 1998 (JP) .......................................... 10-106896

(51) Int. Cl.[7] ................................................ H04J 11/00

(52) U.S. Cl. ...................................... 370/204; 370/208

(58) Field of Search ......................... 370/203–211, 431, 370/342, 464; 375/130, 140, 146, 147, 152

(56) References Cited

U.S. PATENT DOCUMENTS 4,047,121 A * 9/1977 Campbell .................... 331/76
5,365,361 A * 11/1994 Noll et al. .................. 359/161
6,421,367 B1 * 7/2002 Kuroyanagi et al. ........ 375/130
6,588,950 B1 * 7/2003 Pfeiffer ...................... 398/140

FOREIGN PATENT DOCUMENTS

JP H6-318927 A 11/1994

OTHER PUBLICATIONS

Naoki Suehiro and Noriyoshi Kuroyanagi "Multipath–Tolerant Binary Signal Design for Approximately Synchronized CDMA Systems Without Co–Channel Interference Using Complete Complementary Codes" Mar. 19, 1998, pp.: 43–48.

* cited by examiner

*Primary Examiner*—Hassan Kizou
*Assistant Examiner*—Dmitry Levitan
(74) *Attorney, Agent, or Firm*—Koda & Androlia

(57) ABSTRACT

In comb-form spectrum communication systems using repeated complementary sequence modulation, a transmitting signal is constituted by assigning one set of N auto-complementary sequences to each user, where N is an integer equal to or higher than 2, and by transforming the N sequences to N repeated signals which have comb-form spectra without overlapping in frequency with one another with a method of repeating each sequence of the set of auto-complementary sequences a plurality of times, and by assigning the N complementary sequences with auto-complementary sequence characteristics to the N comb-form spectra. Thus, the near-far problem is solved by making the cross-correlation between a signal input to a user's station but addressed to another station and the user's reference code sequence, zero.

8 Claims, 8 Drawing Sheets

(Only Right-Side of the Carrier Frequency(Upper Side-Band Component) Illustrated, $A_0$ TO $B_1$: Eight Chip Codes

COMB-FORM SPECTRUM COMMUNICATION SYSTEMS USING REPEATED COMPLEMENTARY SEQUENCE MODULATION

BACKGROUND OF THE INVENTION

1. Field of the Invention

The present invention relates to comb-form spectrum communication systems using repeated complementary sequence modulation and relates to, in particular, means for solving the communication interruption caused by so-called near-far problem.

2. Description of the Background Art

In recent mobile communication systems such as a mobile telephone and a PHS (Personal Handyphone System), a Time Division Multiple Access (to bereferred to as 'TDMA' hereafter) system is adopted so as to provide a necessary channel capacity for the system. The TDMA system is designed in order to allow a plurality of users to share a predetermined, assigned frequency band, so that the time axis of the signal is divided to thereby assign the divisions to users, respectively. The usable frequency band is, however, limited and the number of time divisions is also limited technically, for which reason the number of channels which can be assigned to users is limited, as well.

In recent years, as the user population of mobile communication systems stated above increases, there has been proposed a Code Division Multiple Access (to be referred to as 'CDMA' hereafter) system so as to provide the necessary channel capacity for the system. A CDMA system is designed in order to allow a plurality of users to share the same band, so that the users are identified with address spteading codes (inherent codes) assigned to them, respectively. Therefore, to facilitate the identification of the inherent codes, the inherent codes are made on a clock frequency of higher than that of an information signal, for example, two or three $MH_z$. The information signal is multiplied by the inherent codes to thereby increase the bandwidth of the transmission signal (or to spread the spectrum) and it is transmitted to a transmission path. Then, at a receiver, the correlation characteristics of the received signal is obtained using matched filters etc. and the inherent codes are thereby demodulated. As stated above, since a CDMA system allows a plurality of users to share the same band, the number of users per bandwidth can probably increase compared with a TDMA system. Nevertheless, the problem of CDMA systems is that the number of simultaneous communication channels cannot increase due to the interference that are the signals coming from other users which share the same band, and also due to the near-far problem which will be described later.

FIG. 10 is a functional block diagram showing an example of the constitution of a conventional CDMA system. In FIG. 10, four users are assumed. Since the following explanation will be given for a case where information signals are transmitted from a user A to a user B and from a user D to a user C, respectively, the receivers of users A and D and the transmitters of users B and C are not shown in FIG. 10.

In the CDMA system shown therein, each user possesses a transmitter 105 (205) serving as a transmitting system and consisting of the first multiplier 102 (202) which multiplies an transmission information signal a (b) outputted from a transmitting information generator 100 (200) by the output signal of the first spreading code (PN code) generator 101

(201) which generates inherent codes with a time width of Δt, assigned to respective users, and the second multiplier 104 (204) which multiplies the output signal of the first multiplier 102 (202) by the output carrier signal of the first local signal generator 103 (203).

Also, each user possesses a receiver 116 (216) serving as a receiving system and consisting of the third multiplier 112 (212) which multiplies a received signal 110*b* (110*c*) coming from a transmission path 110 which takes a space as the medium, by the output signal of the second local signal oscillator 111 (211), and a matched filter 115 (215) which is composed of an integrator 114 (214) connected to the fourth multiplier 113 (213) multiplying the output signal of the third multiplier 112 (212) by the output signal of the second spreading code (PN code) generators 117 (217) generating the inherent code.

The required conditions for the above-described spreading codes are: (1) there are a lot of combinations of codes so that inherent codes can be assigned to a lot of users; (2) cross-correlation is so little that the code of a user can be discriminated from that of another user; (3) auto-correlation to the same codes is impulsive so as to track the signal addressed to the desired station and to facilitate the demodulation; (4) a code is as random and long in length as possible to prevent the third party from eavesdropping the communications content, and so on. Generally, PN (pseudo-noise) codes are utilized as codes satisfying the above conditions.

Next, the operation of the CDMA system shown in this example will be described. First, consider that user A who transmits an information signal a to user B. At the transmitter 105 of user A, the code generated at the first PN code generator 101 is set to an inherent code Mb assigned to user B. The inherent code Mb is multiplied by the information signal a at the first multiplier 102 to thereby spread the spectrum, and the frequency of the resultant signal is transformed (modulated) to a transmission frequency by both the second multiplier 104 and the first local carrier signal generator 103, and then the resultant output is sent out to the transmission path 110.

When receiver 116 of user B receives the said transmission signal, a received signal 110*b* is outputted to matched filter 115 after the frequency is transformed (demodulated) by both oscillator 111 having the same output frequency as the modulation frequency f0, and multiplier 112. Matched filter 115 functions as a time correlator in terms of operational principle (for which detail, see, for example, "Communication System", page 297, B. P. Lathi, translated in Japanese by Sonosuke YAMANAKA and Koichi USAMI, McGraw-Hill Kogakusha, October 1981) and PN code generator 117 outputs the inherent code Mb assigned to the user B's station. As a result, the output of the auto-correlation characteristics of the inherent code sequence Mb is produced from matched filter 115.

FIG. 11 shows an example of the auto-correlation characteristics of the PN code which shows little correlation with a sequence shifted in phase by more than one chip. Consequently, if the same code as the inherent code assigned to the user B's station is inputted to the receiver, the matched filter produces the output of sharp auto-correlation characteristics, whereby the receiver can easily determine whether the received signal is addressed to the user B's station or not.

Now consider that an information signal b is transmitted from user D to user C while the information signal a is transmitted from user A to user B as stated above, the code of PN code generator 201 is set to an inherent code Mc assigned to user C at transmitter 205 of user D as in the case of the transmission operation of transmitter 105 of user A. The inherent code Mc is multiplied by the information signal b at multiplier 202 to thereby spread the spectrum and, at the same time, the frequency of the resultant signal is transformed (modulated) to a transmission frequency by both multiplier 204 and the output signal of local signal generator 203. Then the resultant transmission signal is transmitted to transmission path 110.

Accordingly, if receiver 216 of user C receives the signal transmitted from user D, PN code generator 212 outputs the inherent code Mc assigned to the user C's station as a spreading code. Thus, by performing the same operation as that of receiver 116 of user B stated above, the output of the auto-correlation characteristics shown in FIG. 11 are produced from matched filter 215. As a result, receiver 216 of user C recognizes that the received signal is addressed to the user C's station.

Meanwhile, the signal spread by the PN code Mc transmitted from transmitter 205 of user D is also inputted to receiver 116 of user B through transmission path 110. Consequently, the output of the cross-correlation characteristics between the inherent code Mc of user C and the inherent code Mb of user B are produced from matched filter 115.

FIG. 12 shows the concept of the cross-correlation characteristics of PN codes. The detail thereof is not described herein since it is described in, for example, "Spectrum Spread Communication System", pp. 406–409, Mitsuo YOKOYAMA, Kagaku-Gijutsu Publishing company, INC., 1988. In short, the cross-correlation characteristics between different PN codes have various values according to the combinations of PN sequences and do not have fixed values as indicated by the auto-correlation characteristics shown in FIG. 11.

Therefore, matched filter 115 produces not only the output of the auto-correlation characteristics for detecting a signal addressed to the user B's station shown in FIG. 11, but also unnecessary output of the cross-correlation characteristics shown in FIG. 12. Generally, the cross-correlation characteristics among inherent codes such as Mb and Mc assigned to respective users are designed to take levels sufficiently lower than those of the auto-correlation characteristics, by making the codes not similar to one another.

Nonetheless, the conventional CDMA system using PN codes as spreading codes stated above has the following major problems. Since each user freely moves in mobile communication, there are some cases where the signal (interference wave) level (cross-correlation characteristics shown in FIG. 12) inputted to a user's receiver but addressed to a different station is higher than that (the auto-correlation characteristics shown in FIG. 11) addressed to the user's station, depending on the user's position. This is a well-known problem called 'near-far problem'. If the problem occurs, the signal addressed to the user's station is masked by the interference wave and cannot be detected. Furthermore, communication disturbance occurs, such as caused by multi-path signals due to reflection waves which disturbs receiver detecting operation similarly to the interference waves.

To avoid the near-far problem, it is essential to appropriately control the transmission power levels of the respective transmitters in the overall system in accordance with the movement of the users. It has been disadvantageous that the power control makes the system constitution complicate and large in size.

The present invention has been made to solve the above-stated problems on the conventional CDMA communication systems. The invention is to make the matched filter output level (the cross-correlation characteristics between the interference wave and a desired station signal) zero when an interference wave is given to the input to thereby solve the near-far problem. It is, therefore, an object of the present invention is to provide a CDMA communication system which is composed of a simple constitution because it does not require the transmission power control of the respective transmitters, and is easily equipped with multi-path signal separation function.

SUMMARY OF THE INVENTION

To achieve the above object, a first aspect of the present invention is comb-form spectrum communication systems using repeated complementary sequence modulation wherein a transmitting signal is constituted by assigning one set of N auto-complementary sequences to each user, where N is an integer equal to or higher than 2, and by transforming said N sequences to N repeated signals which have comb-form spectra without overlapping in frequency with one another with a method of repeating one of said auto-complementary sequences a plurality of times, and by assigning said N complementary sequences with auto-complementary sequence characteristics to said N comb-form spectra.

A second aspect of the invention is comb-form spectrum communication systems using repeated complementary sequence modulation based on the comb-form spectrum communication systems using repeated complementary sequence modulation according to the first aspect, wherein said transmitting signal is constituted by preparing N shift carrier waves so that the K-th frequency is made by adding the inverted value $f_T$ of a symbol period T K-times to a reference frequency so as to prevent said N comb-form spectra from overlapping with one another, where K=0, 1, 2, . . . , N−1, and by composing N signals each created by modulating said respective N shift carrier waves with repeated sequences which are made by repeating respective sequences of each set of N complementary sequences which have a relation of auto-complementary sequences.

A third aspect of the invention is comb-form spectrum communication systems using repeated complementary sequence modulation based on the comb-form spectrum communication systems using repeated complementary sequence modulation according to the first aspect, wherein said set of N auto-complementary sequences assigned to each user are constituted so that said set of N auto-complementary sequences assigned to each user is cross-complementary to a set of N auto-complementary sequences assigned to another user; and the carrier waves used by all the users are said N shift carrier waves.

A fourth aspect of the invention is comb-form spectrum communication systems using repeated complementary sequence modulation based on the comb-form spectrum communication systems using repeated complementary sequence modulation according to the second aspect, wherein for a case where said set of auto-complementary sequences assigned to each user are not cross-complementary to a set of sequences assigned to another user, said transmitting signals are constituted so that the complementary sequences assigned to each user modulate said shift carrier waves whose frequencies are different from those used by the other users.

A fifth aspect of the invention is comb-form spectrum communication systems using repeated complementary sequence modulation based on the comb-form spectrum communication systems using repeated complementary sequence modulation according to one of the first to fourth aspects, wherein at a receiver side of the system, N matched filters each matched to a part of a code made by repeating each sequence of said set of N auto-complementary sequences are arranged in parallel in accordance with said set of N auto-complementary sequences, and the transmitted information is detected based on a result obtained by adding the correlation outputs of said N matched filters.

A sixth aspect of the invention is comb-form spectrum communication systems using repeated complementary sequence modulation based on the comb-form spectrum communication systems using repeated complementary sequence modulation according to one of the first to fourth aspects, wherein pseudo-periodic sequences, such as obtained by copying the rear and front portions with multiple chips of a finite-length periodic sequence which is made by repeating each sequence of said set of N auto-complementary sequences, and thereby adding the copied portions to the outer front side and the outer rear side of said finite length periodic sequence respectively, are used as codes assigned to respective users; and matched filters, each matched to said finite length periodic sequence made before extending itself to said pseudo-frequency sequence, are used for demodulation at the receiver side.

A seventh aspect of the invention is comb-form spectrum communication systems using repeated complementary sequence modulation wherein correlation outputs are obtained by using convolvers instead of said matched filters according to one of the fifth and sixth aspects.

DESCRIPTION OF THE PREFERRED EMBODIMENTS

Figure 1:
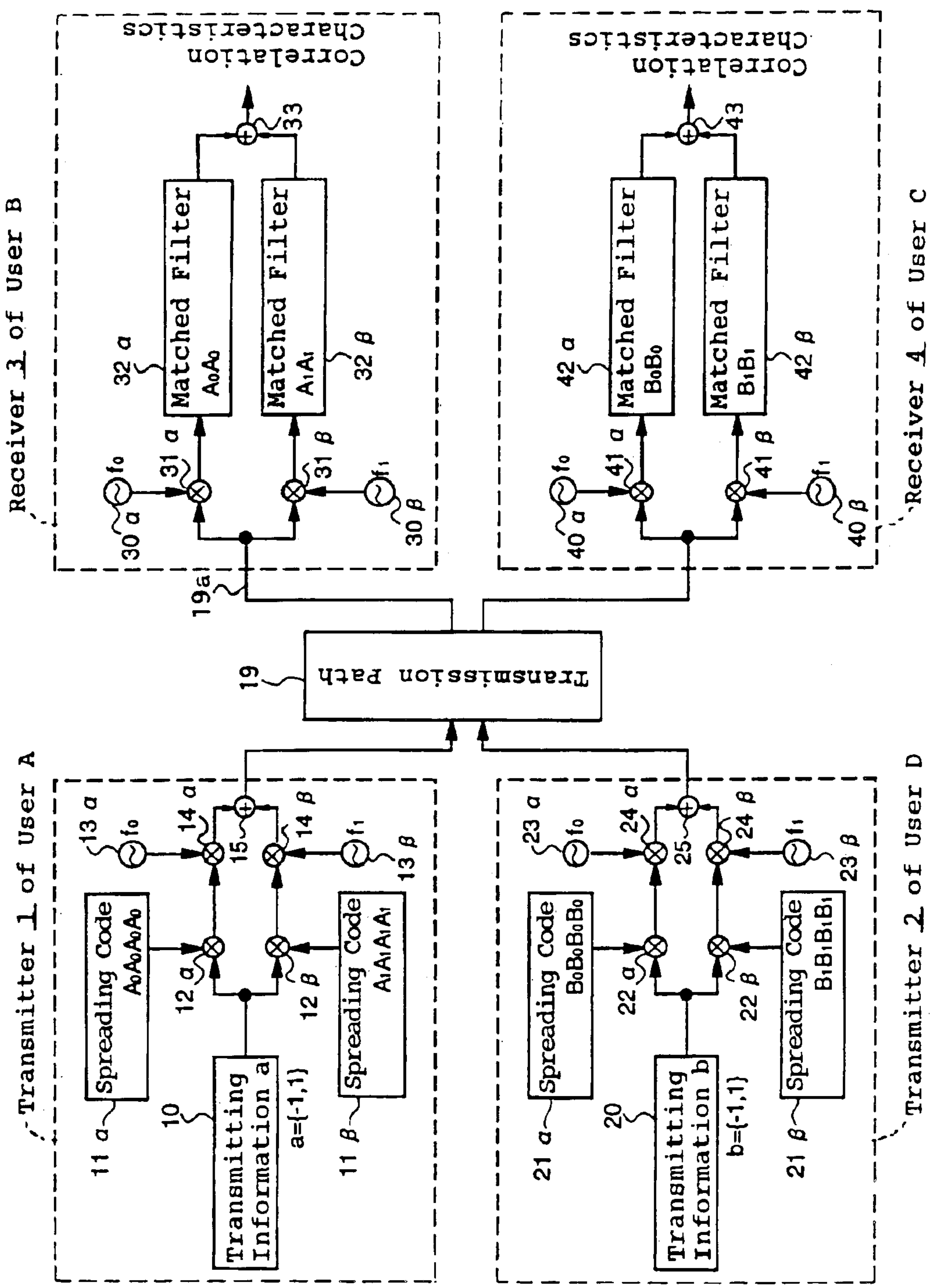
FIG. 1 is a functional block diagram showing the first embodiment of a CDMA communication system according to the present invention.

Now, the present invention will be described in detail based on the embodiments shown in the drawings.

FIG. 1 is a functional block diagram showing the first embodiment in a case where the communication system according to the present invention is applied to a CDMA communication system. In FIG. 1, it is assumed that there are four system users. As in the case of the description of "Background of Art", description will be given to a case where information signals are transmitted from a user A to a user B and a user D to a user C, respectively. Therefore, the description on the receivers of users A and D as well as the transmitters of users B and C are omitted.

In addition, N auto-complementary sequences (where N is an integer equal to or higher than 2), which will be described later, used as inherent codes can be assigned to each user. For brevity's sake, description will be given to a case where N=2, i.e., a pair of auto-complementary sequences are used by each user.

In a CDMA communication system shown in this example, each user possesses a transmitter 1 (2) serving as a transmitting system and consisting of the first pair of multipliers 12α, 12β (22α, 22β) which multiply the output signals of a transmitting information generator 10 (20) outputting transmitting information a (b) by the output signals of a pair generators 11α, 11β (21α, 21β). The respective generators generate a pair of auto-complementary sequences as the first spreading codes which are the pair of inherent codes assigned to each user. And the first adder 15 (25) adds the outputs of the second pair of multipliers (mixers) 14α, 14β (24α, 24β) which multiply the output signals of the first multipliers 12α, 12β (22α, 22β) by the output signals of the first pair of local signal generators 13α, 13β (23α, 23β).

Each receiver also possesses a receiver 3 (4) serving as a receiving system and consisting of a pair of matched filters 32α, 32β (42α, 42β) connected to the third pair of multipliers (mixers) 31α, 31β (41α, 41β). These mixers multiply a received signal 19*a* (19*b*) which is conveyed through a transmission path 19 by the output signals of the second pair of local signal oscillators 30α, 30β (40α, 40β). And the second adder 33 (43) adds the outputs of matched filters 32α, 32β (42α, 42β). The detailed functional block diagram of matched filters 32α, 32β (42α, 42β) are not shown in FIG. 1. However, they are the same as a conventional filter functioning as a time correlator equipped with both a multiplier multiplying an input signal by the output signal of the second code generator which generates an inherent code (one of the pair of auto-complementary sequence) assigned in advance to each user and an integrator connected to the multiplier.

The same correlation outputs as those of matched filters 32α, 32β, 42α, 42β can be obtained even if the filters are replaced by convolvers. In that case, the reference input of, for example, a convolver used as 32α is a sequence A0A0 to be stated later.

Prior to starting the description of the function of the CDMA communication system shown in this example, the correlation characteristics of the auto-complementary sequences used as spreading codes (inherent codes) characterizing the present invention and the frequency spectrum characteristics of the codes constituted by repeating each of auto-complementary sequences will be described in detail.

First, by way of example, the following eight-chip code sequences are taken:

$$A0=(1, 1, 1, -1, 1, 1, -1, 1) \quad (1)$$

$$A1=(1, -1, 1, 1, 1, -1, -1, -1) \quad (2)$$

$$B0=(1, 1, 1, -1, -1, -1, 1, -1) \quad (3)$$

$$B0=(1, -1, 1, 1, -1, 1, 1, 1) \quad (4).$$

The aperiodic auto-correlation function of A0 is obtained as:

$$A0*A0=(1, 0, 1, 0, 3, 0, -1, 8, -1, 0, 3, -0, 1, 0, 1) \quad (5).$$

The aperiodic auto-correlation function of A1 is obtained as:

$$A1*A1=(-1, 0, -1, 0, -3, 0, 1, 8, 1, 0, -3, 0, -1, 0, -1) \quad (6).$$

The sum of the auto-correlation functions of A0 and A1 is:

$$A0*A0+A1*A1=(0, 0, 0, 0, 0, 0, 0, 16, 0, 0, 0, 0, 0, 0, 0) \quad (7).$$

Thus, a sequence which does not have a side lobe except at the central shift in chip is obtained. {A0, A1} is referred to as auto-complementary sequences.

Likewise, the auto-correlation functions of B0 and B1 are obtained and the sum of them is obtained as follows:

$$B0*B0=(-1, 0, -1, 0, -3, 0, 1, 8, 1, 0, -3, 0, -1, 0, -1) \quad (8)$$

$$B1*B1=(1, 0, 1, 0, 3, 0, 0, -1, 8, -1, 0, 3, 0, 1, 0, 1) \quad (9)$$

$$B0*B0+B1*B1=(0, 0, 0, 0, 0, 0, 0, 16, 0, 0, 0, 0, 0, 0, 0) \quad (10).$$

Thus, {B0, B1} is auto-complementary sequences, as well.

Further, if sequence A0 in Eq. (1) is applied to the matched filter of the reference sequence B0 expressed by Eq. (3), the matched filter functions as a time correlator as stated above, and the cross-correlation function between A0 and B0 is obtained at the output terminal of said matched filter as follows:

$$A0*B0=(-1, 0, -1, 0, -5, 0, 3, 0, 1, 0, 1, 0, 1, 0, 1) \quad (11).$$

Likewise, if the sequence A1 is applied to the matched filter of the reference sequence B1, the cross-correlation function between A1 and B1 is obtained at the output terminal of the matched filter as follows:

$$A1*B1=(1, 0, 1, 0, 5, 0, -3, 0, -1, 0, -1, 0, -1, 0, -1) \quad (12).$$

Consequently, the sum of the Eqs. (11) and (12) is:

$$A0*B0+A1*B1=(0, 0, 0, 0, 0, 0, 0, 0, 0, 0, 0, 0, 0, 0, 0) \quad (13).$$

On the contrary, if sequence B0 expressed by Eq. (3) is applied to the matched filter of the reference sequence A0 expressed by Eq. (1), the cross-correlation function between B0 and A0 is obtained at the output terminal of the matched filter as follows:

$$B0*A0=(1, 0, 1, 0, 1, 0, 1, 0, 3, 0, -5, 0, -1, 0, -1) \quad (14).$$

If sequence B1 expressed by Eq. (4) is applied to the matched filter of the reference sequence A1 expressed by Eq. (2), the cross-correlation function between B1 and A1 is obtained at the output of the matched filter as follows:

$$B1*A1=(-1, 0, -1, 0, -1, 0, -1, 0, -3, 0, 5, 0, 1, 0, 1) \quad (15).$$

Consequently, the sum of Eqs. (14) and (15) is:

$$B0*A0+B1*A1=(0, 0, 0, 0, 0, 0, 0, 0, 0, 0, 0, 0, 0, 0, 0) \quad (16).$$

That is, when the pairs of auto-complementary sequences, {A0, A1} and {B0, B1}, are applied to pairs of matched filters of respective counterpart reference sequences, respectively, and the outputs of each pair of the matched filters are added, the resultant cross-correlation function becomes zero as expressed by Eq. (13) or (16). Combination sequences {A0, A1} and {B0, B1} having the above characteristic relation are referred to as cross-complementary sequences. Further, if combination sequences {A0, A1} and {B0, B1} are pairs of auto-complementary sequences, [{A0, A1} and {B0, B1}] are referred to as a set of complete complementary sequences.

Now, the frequency spectrum of waveforms in a case where a basic sequence A0 is repeated at every time interval of the frame period T will be described.

If it is assumed that L0 is number of chips/sequence, the length of sequence A0 is given as T=L0Δt0. The spectrum of a periodic baseband signal in which the impulse-sequence is repeated at every interval of T second, is a basic spectrum which consists of such elements of an integer multiple of $f_T$ over −fc0/2~0~fc0/2 as obtained by DFT (discrete Fourier transform) analysis, where fc0=1/Δt0 and $f_T$=1/T. That is, the baseband signal has a spectrum centered around f=0 and containing components in k·$f_T$ (where k=−∞~−2, −1, 0, 1, 2, ~∞).

Actually, however, impulse transmission is impossible. If, for example, a square wave having a time width of Δt0 is used instead of the impulse, the spectrum of the square wave is approximately expressed as a spectrum ranging from -fc0~0~fc0, where 90% or more of the signal energy is contained.

Figure 7:
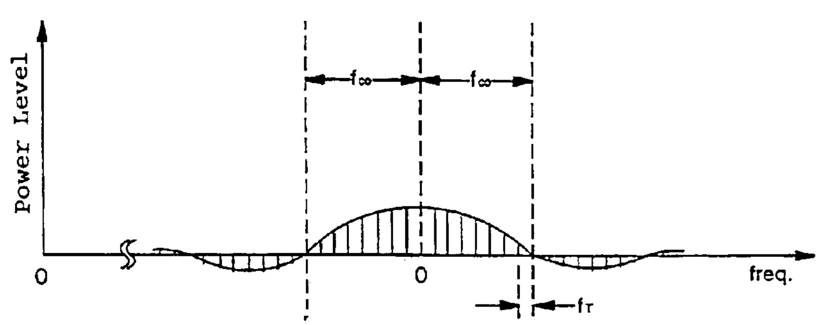
FIG. 7 shows a spectrum in a case where a spreading code waveform (baseband) using a square wave is repeated infinitely.

The components contained other than (−fc0~0~fc0) are out-of-band components. The spectrum of a signal which is made by repeating infinitely a baseband waveform which is a sequence with square waves of a code length of L0=8 in a frame period T, is obtained by DFT analysis as shown in FIG. 7. The spectrum amplitude at f=±fc0 disappears, in the figure, because this frequency coincides with the point on which the sampling function takes zero and it shows the amplitude characteristics in which the amplitudes gradually decrease so as to take the envelope of the sampling function on both sides of f=0.

Now, let us describe the frequency spectrum of a code made by repeating the auto-complementary sequence stated above a plurality of times. A code made by repeating the sequence A0 stated above twice is expressed as:

$$A0A0=(1, 1, 1, -1, 1, 1, -1, 1, 1, 1, 1, -1, 1, 1, -1, 1) \quad (17)$$

Due to the periodicity of repeating the sequence twice, the frequency spectrum takes such a comb-form spectrum that some possible frequency components are lost. If two basic sequences are included in T, T=LΔt and L=2L0=16, then Δt=At0/2 and, therefore, fc=1/Δt=2fc0. Thus, the occupied bandwidth is doubled but the spectrum at k$f_T$ (where k is an odd number) takes zero. The comb-form spectrum, however, overlaps with that of the other code made by repeating the other sequence A1 twice (A1A1) which will be described later. However, it is possible to use them by shifting their frequencies each other.

Figure 2:
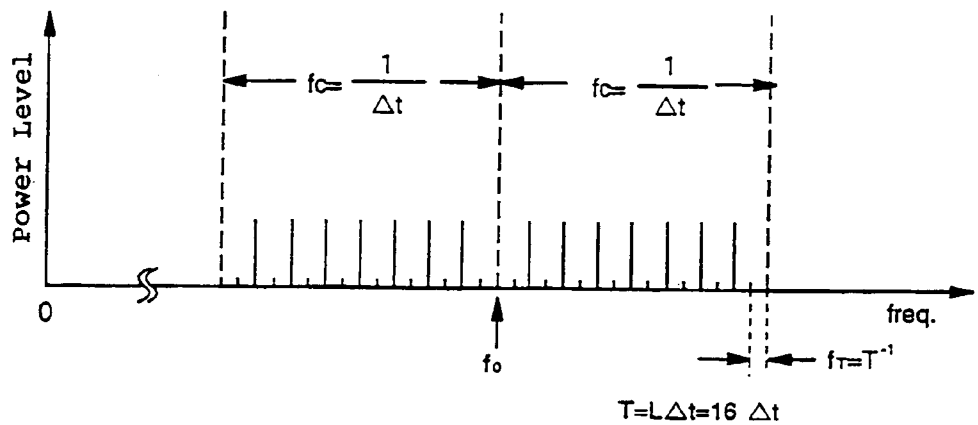
FIG. 2 is a frequency spectrum illustration for a case of modulating a carrier wave of f0 by a sequence constituted by repeating an auto-complementary sequence (A0) twice.

FIG. 2 shows the positive frequency portion of a spectrum in a case where f0 is modulated by a signal having this spectrum by means of DSB-AM (double side band amplitude modulation) (in the figure, the negative frequency components and out-of-band components are not shown and the amplitude decreasing characteristics based on a square wave is not shown, either). Since the basic sequence is repeated twice and the pulse width is halved, it results in fc=2fc0 and making the amplitude at a frequency of $k \cdot f_T$ (where k is an odd number) zero.

Meanwhile, a code constituted by repeating, as stated above, the sequence A1 twice is expressed as:

$$A1A1=(1, -1, 1, 1, 1, -1, -1, -1, 1, -1, 1, 1, 1, -1, -1, -1) \quad (18).$$

Figure 3:
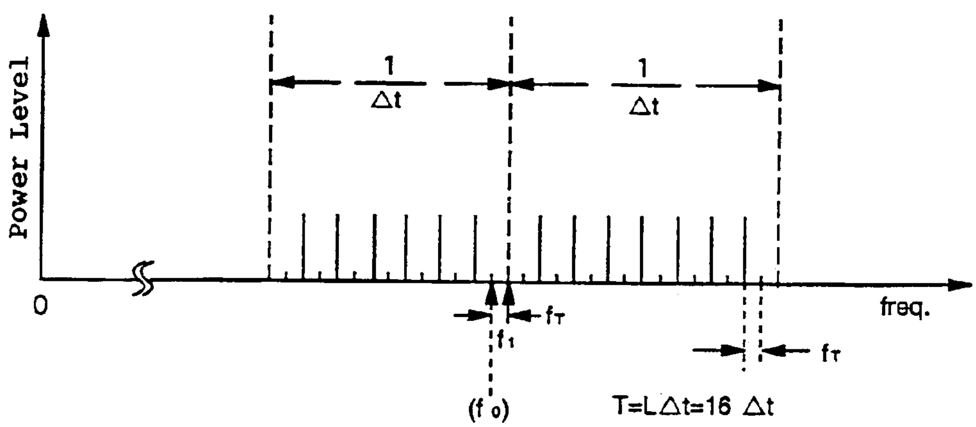
FIG. 3 is a frequency spectrum illustration for a case of modulating a carrier wave of f1 by a sequence constituted by repeating an auto-complementary sequence (A1) twice.

The frequency spectrum of this code takes the same comb-form spectrum as shown in FIG. 2. FIG. 3 shows the frequency spectrum of a signal which is composed by modulating (for frequency transform) a shift carrier wave of a frequency $f1=f0+f_T$ with the code sequence expressed by Eq. (18). In this case, $f_T=1/T$ and the frequency f1 is selected so that the spectra shown in FIGS. 2 and 3 may be interleaved.

Consequently, the signals shown in FIGS. 2 and 3, i.e., the codes expressed by Eqs. (17) and (18) not only have mutually interleaved spectra but also their spectra are distant from each other by an integer times $f_T=1/T$. Hence, they have such orthogonal character that they may not interfere with each other even if they would be simultaneously transmitted under the conditions to be stated later.

The orthogonality stated above also holds true for the relation between a code sequence B0B0 made by repeating B0 and a code sequence B1B1 made by repeating B1 because of the same logic as described above.

In short, only if a plurality of codes belong to pairs of auto-complementary sequences which have the relation of cross-complementary sequences among the pairs, the sum of respective cross-correlation functions between a pair of sequences and the corresponding sequences of another pair have level zero characteristics (no-correlation characteristics). In addition, since code sequences made by repeating a sequence a plurality of times, form vacant components in spectrum, these codes can be simultaneously transmitted by using means of setting the frequencies of the carrier waves so as not to overlap their spectra with each other.

In the above description, explained were the correlation characteristics with respect to both auto-complementary sequences and cross-complementary sequences, and in addition, the frequency characteristics with a vacant spectrum of a code made by repeating each sequence of a pair of auto-complementary sequences a plurality of times. These characteristics are the notable features of the present invention, and were explained to describe the operation on the CDMA communication system taken as the first embodiment example shown in FIG. 1. Let us now explain the operation of the CDMA communication system shown in FIG. 1, while taking account of the characteristics of the codes which consists of a pair of auto-complementary sequences as stated above.

As an example of inherent codes assigned to each user, let us explain a case where codes made by repeating each sequence of a pair of the auto-complementary sequences given by Eqs. (1) to (4) four times are used. Thus, each code has 32 chips in length and is also viewed as a pseudo-periodic sequence having demodulation period with 16 chips. Therefore, by setting shift carrier waves f0 and f1 to have $f0+kf_T$ (where K=0, 1, 2, . . . , N−1), the respective codes composed of a pair of auto-complementary sequences can be simultaneously transmitted, because their spectra do not overlap with one another.

First, in order to transmit an information signal a from user A to user B, sequences produced from the first pair of auto-complementary sequence generators 11α and 11β accomodated in transmitter 1 of user A are set to be inherent codes A0A0A0A0 and A1A1A1A1, respectively, which are assigned to user B.

Transmitted to a transmission path 19 a transmitting signal which is produced by such a method that the inherent codes are multiplied by the information signal a at the first pair of multipliers 12α, 12β, respectively, to thereby spread the spectrum, and then the spread outputs are frequency-transformed (modulated) with transmitting shift carrier wave frequencies f0 and f1 which are supplied by the first pair of local oscillators 13α, 13β, respectively, at the second pair of multipliers 14α, 14β and the frequency shifted outputs thereof are added together at adder 15 to make the transmitting signal. In this process, transmitting carrier wave frequencies f0 and $f1(=f0+f_T)$ are designed so that codes A0A0A0A0 and A1A1A1A1 may have spectra which do not overlap with each other based on the pseudo-periodic sequence properties stated above. For this reason, when these signals are transmitted simultaneously and they are correlatively detected for T seconds at the receiver side, there is no inter-code interference occurs, because the frequency components of these signals are orthogonal to each other.

If receiver 3 of user B receives the transmitted signal from user A, the signal is frequency-transformed (demodulated) by carrier waves of frequencies f0 and f1 supplied from the second pair of local oscillators 30α, 30β, respectively, at the third pair of multipliers 31α, 31β, and the transformed outputs are applied to a pair of matched filters 32α, 32β, respectively. Since matched filters 32α, 32β function as time correlators as stated above, they produce the correlation function with the input codes.

Here, to explain quantitatively the correlation characteristics, the above-stated modulation and demodulation signals are expressed by numeric equations. First, code A0A0A0A0 is modulated by frequency f0 and demodulated by frequency f0, then code A0A0A0A0 is obtained again. By contrast, if code A0A0A0A0 is modulated by frequency f0 and demodulated by frequency f1, an output expressed by the following equation is obtained:

$$(A0A0)_{f0,\,f1}(A0A0)_{f0,\,f1} \quad (19).$$

Also, if code A1A1A1A1 is modulated by frequency f1 and demodulated by frequency f0, an output expressed by the following equation is obtained:

$$(A1A1)_{f1,\,f0}(A1A1)_{f1,\,f0} \quad (20).$$

If code A1A1A1A1 is modulated by frequency f1 and demodulated by frequency f1, code A1A1A1A1 is obtained again.

Then, if A0 is applied to the matched filter matched to A0, the filter outputs:

$$A0*A0=(1, 0, 1, 0, 3, 0, -1, 8, -1, 0, 3, 0, 1, 0, 1) \quad (5),$$

as described above. Thus, if A0 is applied to the matched filter matched to A0A0, used by the receiver of user B shown in FIG. 1, then the matched filter outputs:

$$A0*A0A0=(1, 0, 1, 0, 3, 0, -1, 8, 0, 0, 4, 0, 4, 0, 0, 8, -1, 0, 3, 0, 1, 0, 1) \quad (21)$$

based on the same processing as given by Eq. (5). Therefore, if code A0A0A0A demodulated by frequency f0 is applied to the matched filter matched to A0A0, where the receiver of user B shown in FIG. 1 is assumed, the matched filter outputs the auto-correlation characteristics indicated as follows:

$$A0A0A0A0*A0A0=(1, 0, 1, 0, 3, 0, -1, 8, 1, 0, 5, 0, 7, 0, -1, 16, 0, 0, 8, 0, 8, 0, 0, 16, 0, 0, 8,0,8, 0, 0, 16, -1, 0, 7, 0, 5, 0, 1, 8, -1, 0, 3, 0, 1, 0, 1) \quad (22).$$

Then, if code A1A1A1A1 modulated by frequency f1 and demodulated by frequency f0, i.e., signal $(A1A1)_{f1,f0}(A1A1)_{f1,f0}$ expressed by Eq. (20) is applied to the matched filter matched to A0A0, the matched filter outputs the cross-correlation characteristics as follows:

$$(A1A1)_{f1,f0}(A1A1)_{f1,f0}*A0A0=(p15, p14, p13, p12, p11, p10, p9, p8, p7, p6, p5, p4, p3, p2, p1, 0, 0, 0, 0, 0, 0, 0, 0, 0, 0, 0, 0, 0, 0, 0, 0, q1, q2, q3, q4, q5, q6, q7, q8, q9, q10, q11, q12, q13, q14, q15) \quad (23).$$

Here, pi, qj take numeric values other than zero in accordance with the code sequences (or may take zero accidentally). Therefore, even if code A1A1A1A1 is applied to the matched filter matched to A0A0 as indicated by Eq. (23), the components take zero on the shift range from shifted to the left by −8 chips, to shifted to the right by +8 chips around the central shift in chip. In the shift range the auto-correlation characteristics indicated by Eq. (22) is not influenced.

In addition, if code A1A1A1A1 is applied to the matched filter matched to A1A1, the filter outputs the following auto-correlation characteristics as in the case of Eq. (22):

$$A1A1A1A1*A1A1=(-1, 0, -1, 0, -3, 0, 1, 8, -1, 0, -5, 0, -7, 0, 1, 16, 0, 0, -8, 0, -8, 0, 0, 16, 0, 0, -8, 0, -8, 0, 0, 16, 1, 0, -7, 0, -5, 0, -1, 8, 1, 0, -3, 0, -1, 0, -1) \quad (24).$$

Furthermore, if code A0A0A0A0 modulated by frequency f0 and demodulated by frequency f1, i.e., the signal $(A0A0)_{f0,f1}(A0A0)_{f0,f1}$ indicated by Eq. (19) is applied to the matched filter matched to A1A1, then the filter outputs the following cross-correlation characteristics obtained by the same processing as that of Eq. (23):

$$(A0A0)_{f0,f1}(A0A0)_{f0,f1}*A1A1=(r15, r14, r13, r12, r11, r10, r9, r8, r7, r6, r5, r4, r3, r2, r1, 0, 0, 0, 0, 0, 0, 0, 0, 0, 0, 0, 0, 0, 0, 0, 0, s1, s2, s3, s4, s5, s6, s7, s8, s9, s10, s11, s12, s13, s14, s15) \quad (25).$$

Here, ri, sj take numeric values other than zero in accordance with the code sequences as in the case of pi and qj; however, the components take zero on the shift range from shifted to the left by −8 to shifted to the right by +8 around the central shift. Therefore, similarly to the case of Eq. (23), Eq. (25) does not influence the auto-correlation characteristics indicated by Eq. (24) in this range.

Accordingly, a signal obtained by adding code A0A0A0A0 multiplied by the transmitting information a and then modulated by f0, and code A1A1A1A1 multiplied by the transmitting information a and then modulated by f1 is expressed by:

$$a\{(A0A0)_{f0}(A0A0)_{f0}+(A1A1)_{f1}(A1A1)_{f1}\} \quad (26).$$

If the signal is demodulated by frequencies f0 and f1, respectively, at the receiver of user B, the signal demodulated by frequency f0 is expressed by:

$$a\{(A0A0)_{f0,f0}(A0A0)_{f0,f0}+(A1A1)_{f1,f0}(A1A1)_{f1,f0}\} \quad (27),$$

and the signal demodulated by frequency f1 is expressed by:

$$a\{(A0A0)_{f0,f1}(A0A0)_{f0,f1}+(A1A1)_{f1,f1}(A1A1)_{f1,f1}\} \quad (28).$$

If the signal demodulated by frequency f0 as indicated by Eq. (27) is applied to the matched filter matched to A0A0 and the signal demodulated by frequency f1 as indicated by Eq. (28) is applied to the matched filter matched to A1A1, and the outputs of both the matched filters are added together at the second adder 33, the result is:

$$a\{(A0A0)_{f0,f0}(A0A0)_{f0,f0}+(A1A1)_{f1,f0}(A1A1)_{f1,f0}\}*A0A0+a\{(A0A0)_{f0,f1}(A0A0)_{f0,f1}+(A1A1)_{f1,f1}(A1A1)_{f1,f1}\}*A1A1 \quad (29).$$

If Eqs. (22) and (23) are applied to the upper stage and Eqs. (25) and (24) are applied to the lower stage in Eq. (29), the result is:

$$a(p15+r15, p14+r14, p13+r13, \ldots, p3+r3, p2+r2, p1+r1, 32, 0, 0, 0, 0, 0, 0, 0, 32, 0, 0, 0, 0, 0, 0, 0, 32, q1+s1, q2+s2, q3+s3, \ldots, q13+s13, q14+s14, q15+s15) \quad (30).$$

Thus, in the shift range from shifted to the left by −7 to shifted to the left by −1 and that from shifted to the right by +1 to shifted to the right by +7 around the central shift (indicated by 32 in value), the output can provide sharp auto-correlation characteristics without a side lobe, whereby it is possible to easily determine that the received signal is of self-addressed.

On the other hand, in parallel with the transmission of an information signal a from user A to user B by means of [A0, A1], an information signal b should be transmitted from user D to user C by the same method such as using a pair of auto-complementary sequences [B0, B1] and carrier waves with the same frequencies f0 and f1 as stated above. For this purpose, let us consider a frequency arrangement (shown in the right side of f0, f1) shown in FIG. 6. In this system, a signal [B0, B1] is mixed into the receiver 3 of user B as an interference wave. The operation will be quantitatively described herein after. If a spreading code B0B0B0B0 is multiplied by the information signal b and modulated by frequency f0 at receiver 2 of user D by the same processing as that carried out at transmitter 1 of user A, another spreading code B1B1B1B1 is multiplied by the same information b and modulated by a frequency f1 and the both signals are added together and transmitted, then the result is:

$$b\{(B0B0)_{f0}(B0B0)_{f0}+(B1B1)_{f1}(B1B1)_{f1}\} \quad (31).$$

Then the resultant signal given by Eq. (3) is demodulated by frequencies f0 and f1, respectively at receiver 3 of user B. A part of the demodulated output which is demodulated by frequency f0 is expressed as follows:

$$b\{(B0B0)_{f0,f0}(B0B0)_{f0,f0}+(B1B1)_{f1,f0}(B1B1)_{f1,f0}\} \quad (32)$$

and the other output which is demodulated by frequency f1 is expressed as follows:

$$b\{(B0B0)_{f0,f1}(B0B0)_{f0,f1}+(B1B1)_{f1,f1}(B1B1)_{f1,f1}\} \quad (33).$$

The signal demodulated by frequency f0 given by Eq. (32) and that demodulated by frequency f1 given by Eq. (33) are applied to the matched filters matched to A0A0 and A1A1, respectively. Then, by adding the outputs of both the matched filters together, the result is obtained similarly to the case of Eq. (29):

$$b\{(B0B0)_{f0,f0}(B0B0)_{f0,f0}+(B1B1)_{f1,f0}(B1B1)_{f1,f1}\}*A0A0+b\{(B0B0)_{f0,f1}(B0B0)_{f0,f1}+(B1B1)_{f1,f1}(B1B1)_{f1,f1}\}*A1A1 \quad (34).$$

If the same processing as that used for deriving Eq. (30) from Eq. (29) is applied, the result of Eq. (34) is expressed by:

$$b(p15'+r15', p14'+r14', p13'+r13', \ldots, p3'+r3', p2'+r2', p1'+r1', 0, 0, 0, 0, 0, 0, 0, 0, 0, 0, 0, 0, 0, 0, 0, 0, 0, q1'+s1', q2'+s2', q3'+s3', \ldots, q13'+s13', q14'+s14', q15'+s15',) \quad (35).$$

Thus, the components takes zero on the shift range from shifted to the left by −8 to shifted to the right by +8 around the central shift.

Consequently, when user B decides that the signal [A0, A1] transmitted from user A is one of the self-addressed signals, based on the correlation values in the shift range from shifted to the left by −7 to shifted to the right by +7, even if the signal [B0, B1] transmitted from another station (user D) is mixed into receiver 3 of user B, the signal [B0, B1] does not disturb the decision of the self-addressed signal carried out based on Eq. (30). This is because the correlation due to [B0, B1] takes zero in the shift range from shifted to the left by −8 to shifted to the right by +8 as indicated by Eq. (35). This is achieved by designing so that sequences [A0, A1] and [B0, B1] may take the relation of cross-complementary sequences despite they use the same band $\{(f0-1/\Delta t)\sim(f1+1/\Delta t)\}$.

Therefore, in the CDMA communication system according to the present invention, in the time period of auto-correlation characteristics when a user decides whether a signal is of self-addressed or not, the correlation characteristics with a mixed signal addressed to a different station take zero without fail, therefore, no near-far problem will take place. This problem takes place for conventional systems due to the positional relation among the respective users. As a result, the transmission power control for each transmitter to be performed following to the movement of each user will not required. Thereby it is possible to make the system quite simple.

Figure 4:
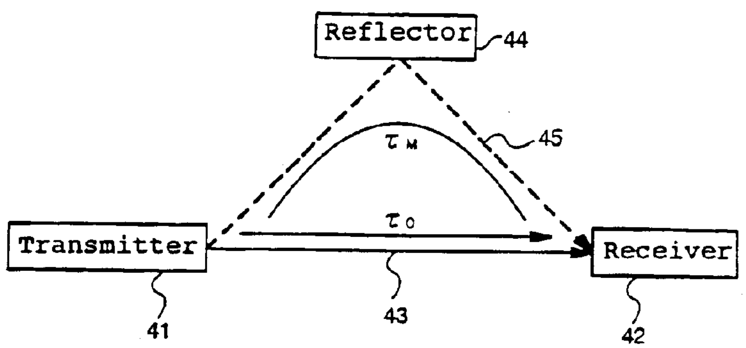
FIG. 4 is a model for explaining the concept of a multi-path signal generation.

Furthermore, by utilizing such characteristics that the correlation with the signal coming from another station takes zero, the CDMA communication system according to the present invention is capable of easily separating the multi-path signals which occur for urban area mobile communications. FIG. 4 is an illustration showing the concept as to how a multi-path signal generates. A transmitting signal sent out from a transmitter 41 is separated into a direct signal 43 directly reaching a receiver 42 and a multi-path signal (reflection signal) 45 reflected by a reflector 44 and then reaching receiver 42. If multi-path signal 45 reaches receiver 42 at the same level as that of direct signal 43, the same-level signals having phases shifted each other are input to receiver 42. This causes a waveform distortion or the like to thereby deteriorate the reception performance of receiver 42.

Figure 5:
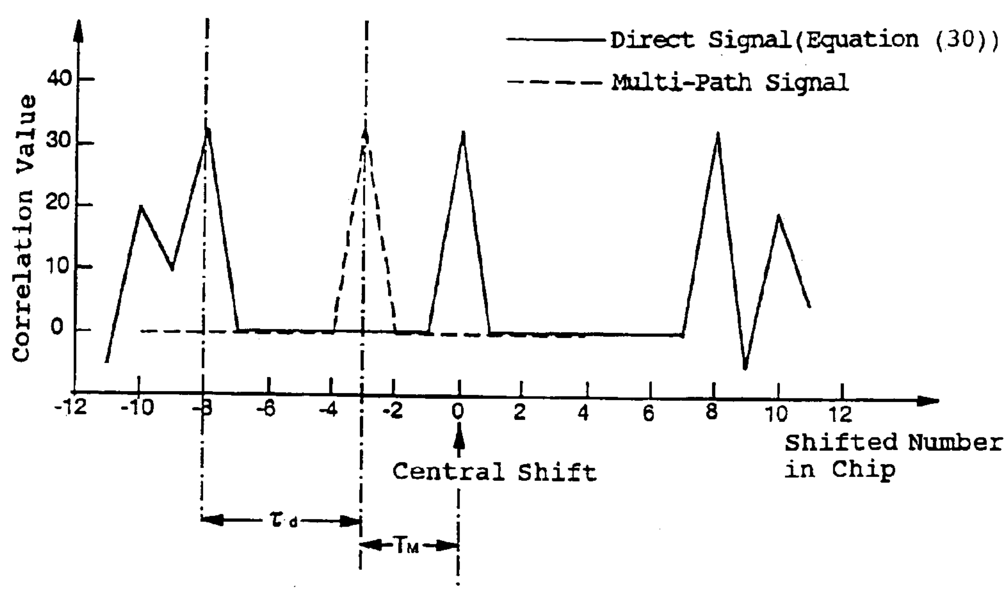
FIG. 5 shows the auto-correlation characteristics of a multi-path signal.

FIG. 5 shows the auto-correlation characteristics observed at the output of the second adder 33 (43) shown in FIG. 1 in a case where multi-path signal 45 is input to the receiver. As stated above, the auto-correlation characteristics do not have a side lobe in the shift range from shifted to the left by −7 to shifted to the right by +7 around the central shift. Therefore, it is possible to separate the direct signal (indicated by solid line) from the multi-path signal (indicated by dotted line) expressed by Eq. (30) due to the phase-shift (time-delay or TM to be described later). The position of the central shift is clarified by synchronization established for the received signals on the received wave. Consequently, if the delay time between the direct wave and the delay wave is denoted by $\tau d=\tau M-\tau \mathbf{0}$ and the code lengths of basic sequences A0 and A1 denoted by L0, then it is possible to ensure separating the multi-path signal as long as $TM=L\mathbf{0}\Delta t-\tau d>0$.

Figure 9:
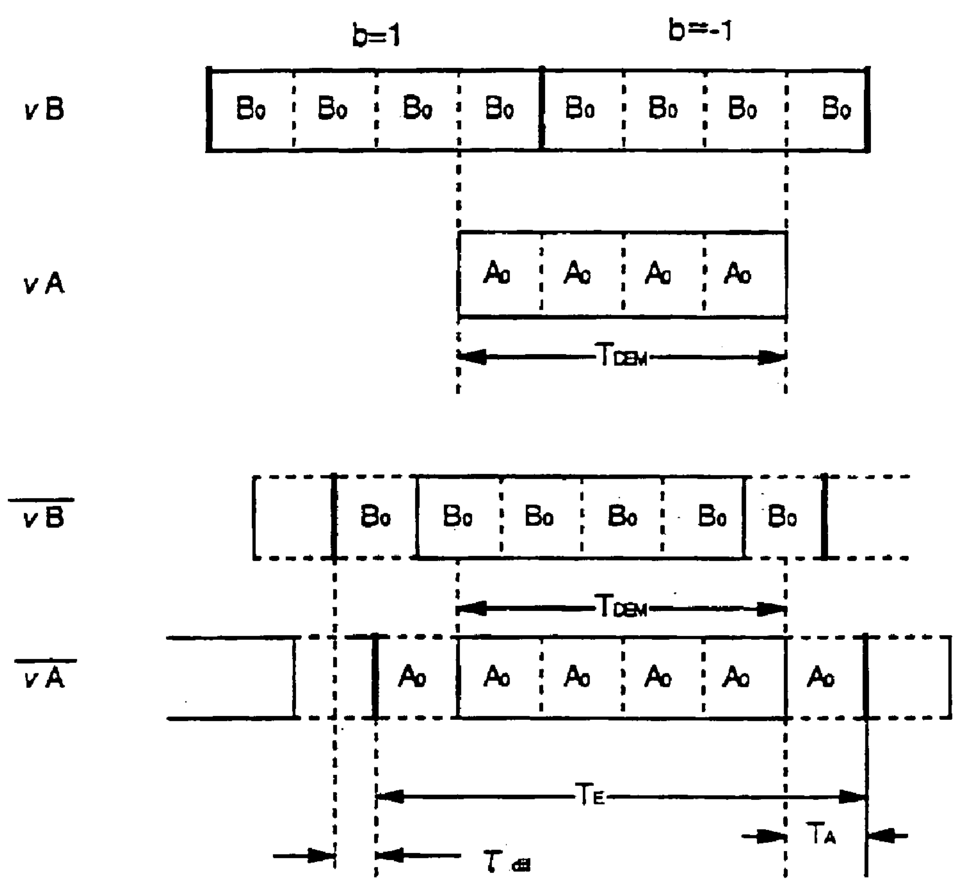
FIG. 9 shows examples of the frame constitution of signals.
Figure 10:
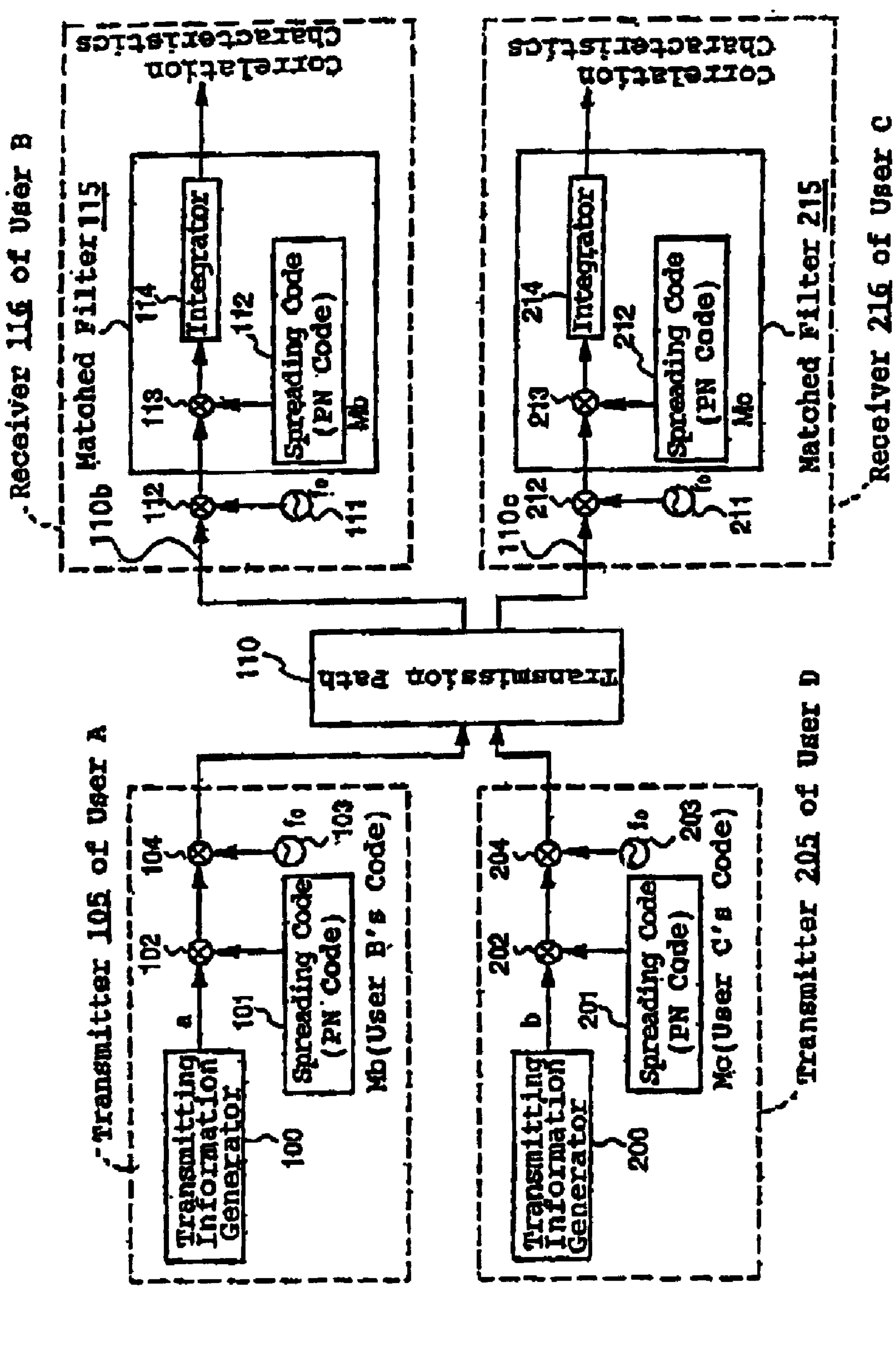
FIG. 10 is a functional block diagram showing an example of the constitution of a conventional CDMA communication system.
Figure 11:
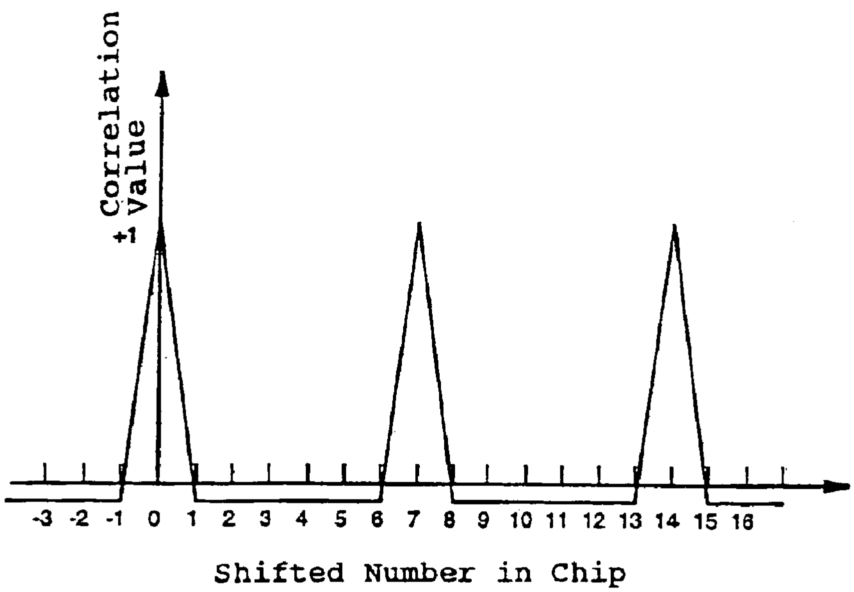
FIG. 11 shows an example of the auto-correlation characteristics of a 7-bit PN code.
Figure 12:
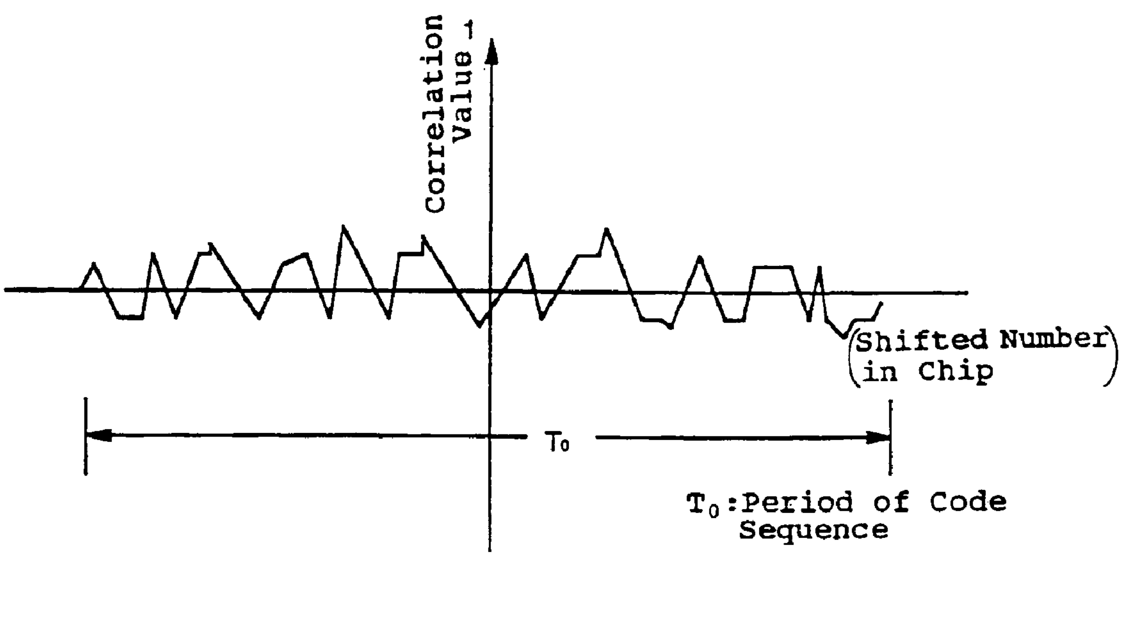
FIG. 12 shows the concept of the cross-correlation characteristics of PN codes.

The system according to the present invention is constructed under the assumption that the incoming phase of an interference wave coincides with that of a desired wave. If a phase difference exists and the boundary of the frame of the interference signal υB is within the frame of the desired signal υA as shown in FIG. 9, then a correlation due to the interference occurs, because υB may be different from the assumed signals described above. This is caused by the fact that υB is modulated by the information b in frame by frame basis.

Although it is actually difficult to synchronize the frame phase of the interference signal with that of the desired signal. However, the control technique which keeps the time difference within τdif shown in the figure has been realized in TDMA mobile communication systems. If it is assumed that the quasi-synchronizing technique is used, and the transmitting signals $\overline{\upsilon A}$ and $\overline{\upsilon B}$ are made so as to have extended frame lengths (pseudo-period) TE longer than the frame length TDEM used for demodulating correlation of a received signal where the receiving time difference τdif between their frames may take so as to be τdif<TA, then only interference waves which are not modulated enter into the demodulation time TDEM of υA, therefore, no correlation caused by $\overline{\upsilon B}$ occurs. The extended frame of $\overline{\upsilon A}$ is formed by adding a tail portion and a front portion of υA to the outer front side and the outer rear side of υA, respectively. FIG. 9 shows a simple example of a case where the constituent element A0 of υA is added to the front and rear portions.

Consider a case where one user uses two transmitters and the other user uses two receivers. For example, one user uses transmitters 1 and 2 and the other user uses receivers 3 and 4 shown in FIG. 1. Thus, one user can simultaneously transmit the transmitting information a and b, with the result that the advantage of doubling transmission speed can be obtained.

In the first embodiment according to the present invention which has been described so far, the system is constructed so that the correlation values of a signal mixed into a user's station and addressed to another station may take zero by assigning the common carrier wave frequencies f0 and f1 which are different to respective users and by assigning spreading codes which are mutually cross-complementary sequences, to respective users. Therefore, if the number of combinations of complementary sequences is m, it is possible to realize m simultaneous communications using almost the same band without causing cross-interference. To carry out the present invention, it should be not necessary to limit the first embodiment. In the second embodiment described hereinafter, for example, spreading codes assigned to each user are the same auto-complementary sequences as used in the first embodiment. However, it can be a frequency division multiple access system such that the codes assigned to each user are not cross-complementary sequences and that carrier waves used for the respective users may have different frequencies.

Figure 6:
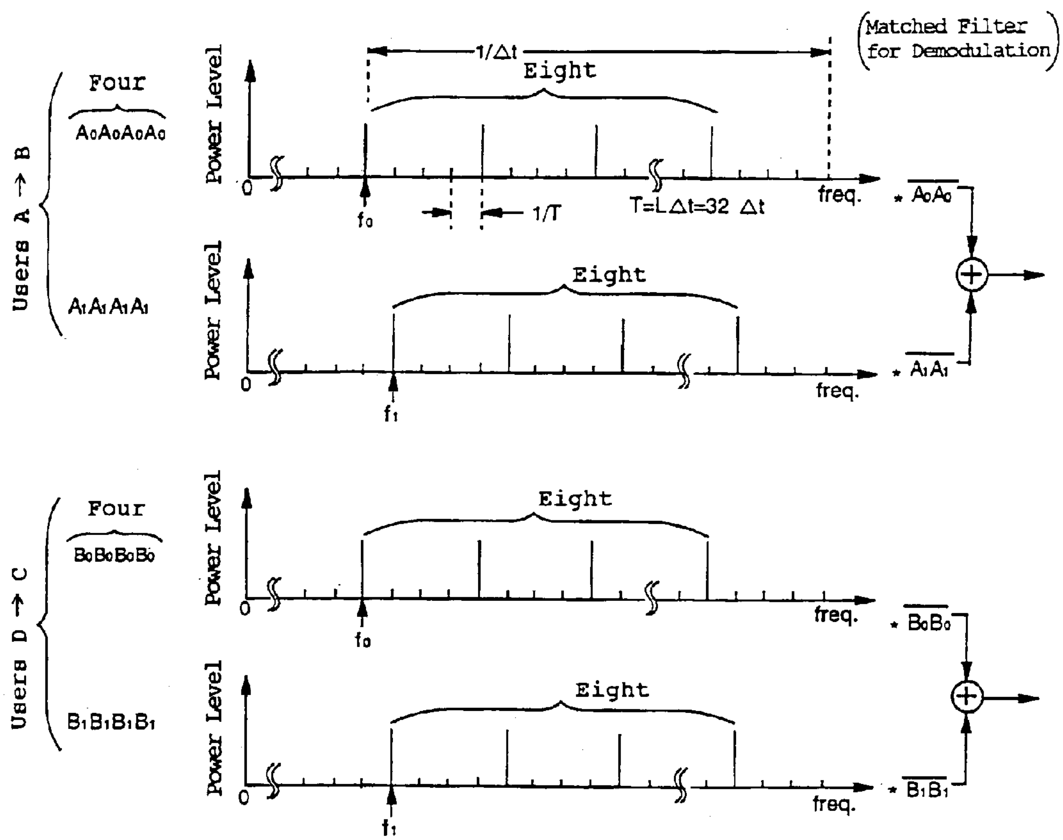
FIG. 6 shows the relation between code sequences assigned to respective users and their frequency spectra in the first embodiment of the CDMA communication system according to the present invention.

FIG. 6 shows the relation between codes and spectra in a case where the system constitution in the first embodiment shown in FIG. 1 is used. Specifically, it shows the relation between pairs of codes each made by repeating each sequence of a pair of auto-complementary sequences assigned to each user to which the signals are transmitted and their spectra, for a case where two users (A, D) amoung four users transmit information signals, respectively. To simplify the illustration of the spectra, it is assumed that each auto-complementary sequence is made by repeating a 8-chip basic sequence four times. For example, it is assumed that A0 in Eq. (1) and A1 in Eq. (2) are provided for transmission (A to B). The spectra of the outputs obtained by modulating (f0, f1) with these repetitive codes, respectively are shown in the upper part of FIG. 6.

Unlike FIG. 8 to be described later, FIG. 6 shows a case where a set of B0 in Eq. (3) and B1 in Eq. (4) which have the relation of cross-complementary sequences with respect to the set of A0 and A1, respectively are used for another transmission (D to C). The spectra of outputs obtained by modulating(f0, f1) with B0 and B1, respectively are shown in the lower part of FIG. 6. Codes A0 and B0 produce transmission waves by modulating carrier wave f0, whereas codes A1 and B1 produce transmission waves by modulating carrier wave f1. The spectra of the carrier waves for transmission from A to B coincide with these of the carrier waves for transmission from D to C as shown in FIG. 6. Due to the relation of cross-complementary sequences, no interference occurs at the receiver side. As for other transmissions (B to A) and (C to D), repetitive code sequences of (A0, A1) and (B0, B1) may be used, respectively and transmission waves are produced by the same method using carrier waves different from f0 and f1, i.e., $$f2=f1+f_T$$

$$f3=f2+f_T.$$

In this case, the same carrier waves are used for transmissions from B to A and from C to D. Although the spectra of the transmission waves in this case are not shown in FIG. 6, they are arranged in the vacant spectra shown therein, so that no interference with transmission waves (A to B) and (D to C) occurs. Therefore, the band occupied by the system in the first embodiment is advantageously halved compared to the band occupied by the case of FIG. 8. If the number of sets of cross-complementary sequences are used, frequency utilization efficiency further enhances.

Figure 8:
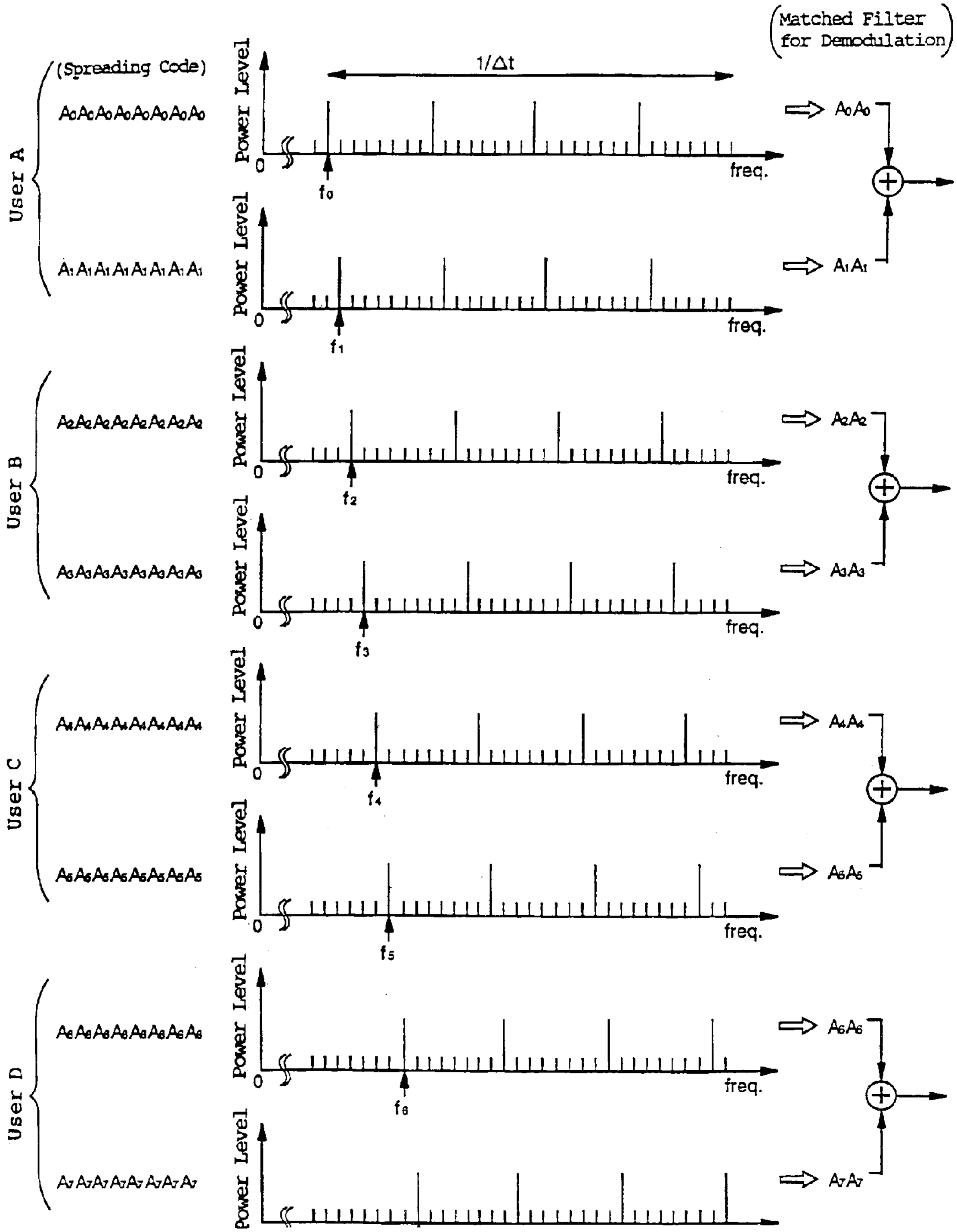
FIG. 8 shows the relation between code sequences assigned to respective users and their frequency spectrum in the second embodiment of the CDMA communication system according to the present invention.

FIG. 8 shows the relation between codes and their spectra for the system constitution in the second embodiment in a case where four users transmit information signals, respectively, and each user only uses codes each made by repeating an auto-complementary sequence, and does not use cross-complementary sequences. This system constitution is realized by replacing the spreading codes at transmitter 2 in FIG. 1 from (B0, B0, B0, B0) to (A6, A6, A6, A6) and from (B1, B1, B1, B1) to (A7, A7, A7, A7), by replacing the carrier waves from (f0, f1) to (f6, f7), by replacing the carrier waves at receiver 4 from (f0, f1) to (f6, f7) and by replacing the codes of matched filters from (B0B0) to (A6A6) and from (B1B1) to (A7A7).

In FIG. 8, to simplify the illustration of the spectra, it is assumed that each auto-complementary sequence is constituted by repeating a 4-chip basic sequence eight times. For example, let us assume to use codes A0=(1, 1, 1, −1) and A1=(1, −1, 1, 1). Consider there is a close relation between the repeating number of sequences and the vacant frequency component spacing in the spectrum. For simultaneous transmission by four users so as not to overlap eight spectra, it is necessary to repeat the auto-complementary sequence eight or more times. FIG. 8 shows the spectra for a case where the frequencies of the carrier waves used by the respective user transmitters are selected as f0 to f7 so that the spectra of respective codes each made by repeating an auto-complementary sequence eight times may not overlap with those of one another.

As stated above, in the first embodiment of the CDMA communication system according to the present invention, cross-complementary sequences are used and therefore it is possible for the receiver side to identify the transmitted waves separately without interference even if the spectra of transmitted waves of the users overlap. Therefore, frequency utilization efficiency enhances. In the second embodiment, since there is no condition that the codes assigned to the respective users should have the relation of cross-complementary sequences, the degree of freedom for possible user codes increases. In this respect, the second embodiment has advantage in that the number of codes to be assigned to each user can be greater than that in the first embodiment. The second embodiment is useful, in particular for a case where it is required to increase the number of users. It is also possible to carry out the second embodiment in combination with the first embodiment.

As stated so far, according to the present invention, a system can be constructed by using such a method that code sequences each made by repeating an auto-complementary sequence a plurality of times are used as the spreading codes and, if necessary further, a pair of code sequences having the relation of cross-complementary sequences with one another are assigned to each station (user) as addresses. Consequently, this systems is capable of avoiding the influence of interference waves, therefore, solving the near-far problem inherent to CDMA communication systems. Thus, it is not necessary to provide the transmission power control function, thereby resulting in allowing simple system constitution. Besides, the present invention contributes greatly to realizing a CDMA communication system capable of easily separating multi-path signals due to the auto-correlation characteristics without a side lobe.

What is claimed is:

1. Comb-form spectrum communication method using repeated complementary sequence modulation, said method comprising:

constituting a transmitting signal by assigning one set of N auto-complementary sequences to each user, where N is an integer equal to or higher than 2, summing N signals each of which is made by repeating one of said N auto-complementary sequences a plurality of times, modulating the repeated sequence with an individual carrier frequency so as to have comb-form spectrum without overlapping in frequency with the other said signals, and arranging said N respective signals having auto-complementary sequence characteristics to N pieces of comb-form spectra.

2. The comb-form spectrum communication method using repeated complementary sequence modulation according to claim 1, wherein said transmitting signal is constituted by the steps of:

preparing N shift carrier waves so that the K-th frequency is made by adding the inverted value fT of a symbol period T K-times to a reference frequency so as to prevent said N comb-form spectra from overlapping with one another, where K=0, 1, 2, . . . , N−1, and composing N signals each created by modulating said respective N shift carrier waves with repeated sequences which are made by repeating respective sequences of each set of N complementary sequences which have a relation of auto-complementary sequences.

3. The comb-form spectrum communication method using repeated complementary sequence modulation according to claim 2, wherein said set of N auto-complementary sequences assigned to each user are constituted so that said set of N auto-complementary sequences assigned to each user is cross-complementary to a set of N auto-complementary sequences assigned to another user; and the carrier waves used by all the users are said N shift carrier waves.

4. The comb-form spectrum communication method using repeated complementary sequence modulation according to claim 2, wherein for a case where said set of auto-complementary sequences assigned to each user are not cross-complementary to a set of sequences assigned to another user, said transmitting signals are constituted so that the complementary sequences assigned to each user modulate said shift carrier waves whose frequencies are different from those used by the other users.

5. The comb-form spectrum communication method using repeated complementary sequence modulation according to one of claims 1 through 4, wherein at a receiver side of the system, N matched filters each matched to a part of a code made by repeating each sequence of said set of N auto-complementary sequences are arranged in parallel in accordance with said set of N auto-complementary sequences, and the transmitted information is detected based on a result obtained by adding the correlation outputs of said N matched filters.

6. The comb-form spectrum communication method using repeated complementary sequence modulation according to one of claims 1 through 4, wherein pseudo-periodic sequences, such as obtained by copying the rear and front portions with multiple chips of a finite-length periodic sequence which is made by repeating each sequence of said set of N auto-complementary sequences, and thereby adding the copied portions to the outer front side and the outer rear side of said finite length periodic sequence respectively, are used as codes assigned to respective users; and matched filters, each matched to said finite length periodic sequence made before extending itself to said pseudo-frequency sequence, are used for demodulation at the receiver side.

7. The comb-form spectrum communication method using repeated complementary sequence modulation wherein correlation outputs we obtained by using convolvers instead of said matched filters recited in claim 5.

8. The comb-form spectrum communication method using repeated complementary sequence modulation wherein correlation outputs are obtained by using convolvers instead of said matched filters reciten in claim 6.

* * * * *